Figure 1:
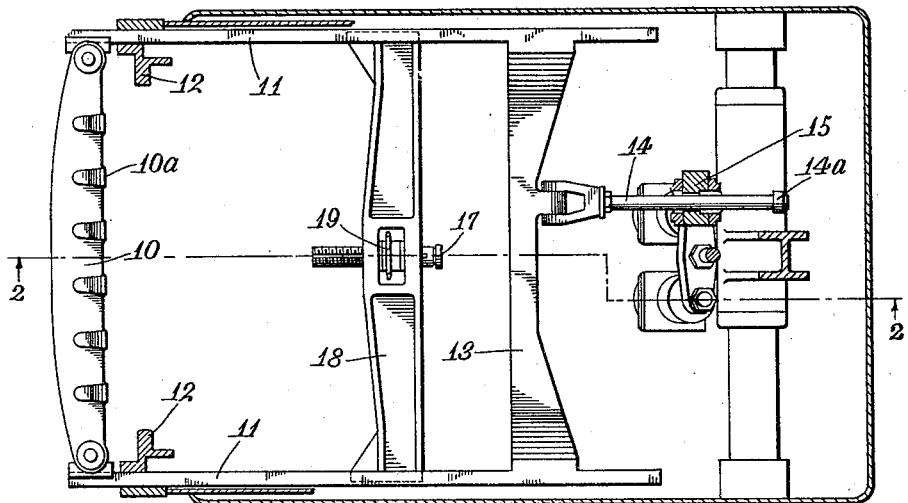

Aug. 9, 1932.  G. B. EGGERT  1,871,264

EJECTOR MECHANISM FOR DOUGH DIVIDERS

Filed Oct. 5, 1931

INVENTOR
GUSTAV B. EGGERT
BY
ATTORNEY

Patented Aug. 9, 1932

1,871,264

UNITED STATES PATENT OFFICE

GUSTAV B. EGGERT, OF SAGINAW, MICHIGAN, ASSIGNOR TO BAKER PERKINS COMPANY, INC., OF SAGINAW, MICHIGAN, A CORPORATION OF NEW YORK

EJECTOR MECHANISM FOR DOUGH DIVIDERS

Application filed October 5, 1931. Serial No. 566,865.

This invention relates to dough dividers of the kind whose operation is characterized by supplying dough from a hopper to a pressure chamber equipped with a power driven plunger which forcibly propels the dough into a measuring cylinder or pocket. A free or floating piston in the measuring pocket is shoved back by the incoming mass of dough until it is halted by a stop adjustably located to give a dough piece of the required volume. The filled measuring pocket is then moved away from the pressure chamber, in a direction substantially at right angles to its longitudinal axis so as to shear off the dough from that in the chamber and leave in the pocket an accurately measured quantity. Upon arrival of the pocket at its discharging station its piston is driven forward by powered mechanisms to eject the scaled dough piece.

In former machines the adjustable stop member was adapted for a single purpose only, namely, to halt the free piston at whatever point in its rearward movement corresponded to the size of dough piece desired. The dough-ejecting mechanisms were functionally independent of the piston stop.

My invention reorganizes the adjustable stop and its associated parts so that it performs both functions, ejecting the measured dough piece as well as stopping the floating piston.

In earlier machines of this type the floating piston in the measuring pocket moves so easily that the dough piece is subjected to practically no pressure until the piston is halted by the adjustable stop, then the dough piece is subjected suddenly to the full pressure created by the plunger in the compression chamber. The actual period of compression is very brief, affording the gas bubbles in the dough piece a very slight opportunity to escape.

It is an object of my invention to reorganize the stop and its associated parts so they will act as a drag, resisting the rearward movement of the piston throughout its travel. The resultant constant pressure must be transmitted through the dough piece, and the latter is, therefore, under compression continuously from the time it begins to enter the measuring pocket until the pocket is filled, and the length of time during which the dough is under pressure is much greater than was the case in prior machines. The effect of this prolonged pressure is to expel the gas bubbles from the dough, giving more uniform accurate scaling.

Further, the improved machine is quiet in operation, since the stop member and pistons are always in contact. There is no noise and jar caused by the floating pistons striking the stop member, as was the case with the old-type machines, and since separate ejector members are not used, there is no noise caused by their striking the pistons.

I attain all of the above objects by means of a combined stop and ejecting mechanism embodied in a simple structure termed hereinafter the reciprocatory gate, adjustable to various positions and having a working face extending throughout the path of movement of the pocket from its filling to its discharge position. The working face of the gate presents a wall parallel to the plane in which the intake end of the pocket slides when the pocket moves from one position to the other. The gate is moved backward by the rearward movement of the piston while the pocket is being filled, and comes to rest; the said wall stops at a predetermined point and then serves as a guide along which the end of the piston slides while the pocket is moving away from its filling position. The gate therefore has two primary characteristics, one being that its face shall be parallel with the intake end surface of the measuring pocket, the other being that it shall be capable of movement rearwardly under the action of the incoming dough piece against the piston in the pocket and forwardly by the action of power-driven mechanism.

With the foregoing and certain other objects in view, which will appear later in the specification, my invention comprises the devices described and claimed and the equivalents thereof.

Figure 2:
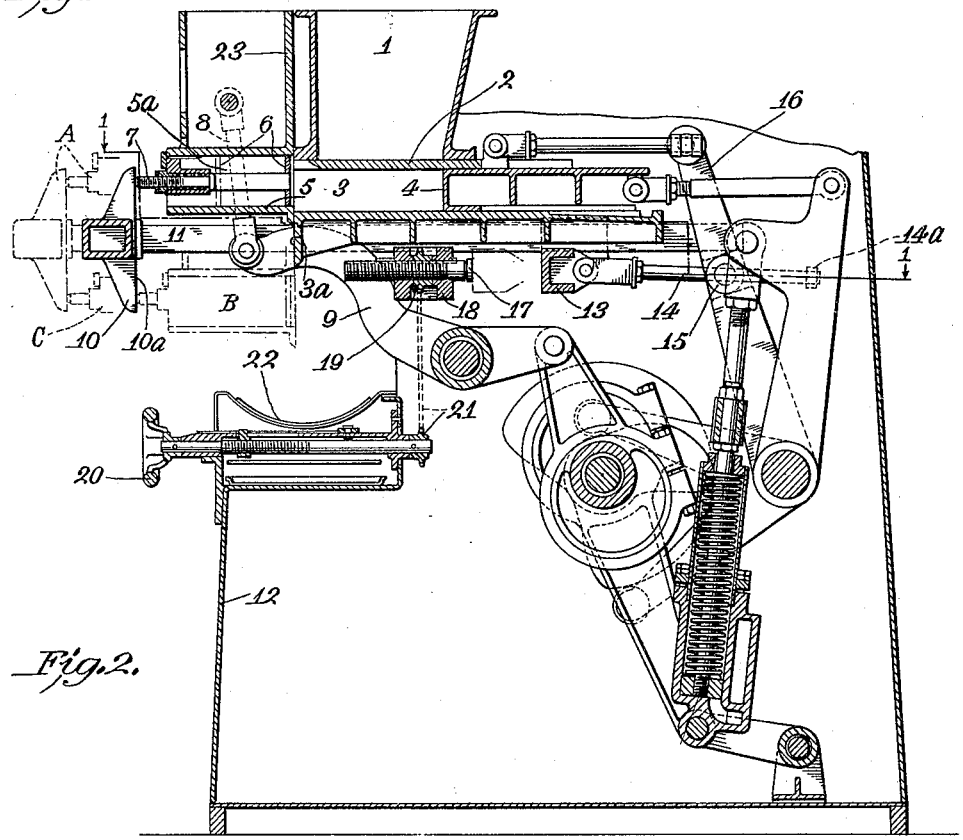

In the drawing Fig. 1 is a plan view, partly in section, taken along line 1—1 in Fig. 2, showing the reciprocating gate mounted on its sliding frame, also the hopper, the pressure plunger and the measuring pocket, their actuating parts being omitted.

Fig. 2 is a vertical section along line 2—2 in Fig. 1, with the actuating parts in place.

Numeral 1 indicates the usual dough supply hopper, 2 the mechanically actuated knife or gate, 3 the pressure chamber, and 4 the mechanically actuated plunger in the pressure chamber, all powered in known manner. The dividing head 5 is provided with one or more measuring pockets 5a.

Each measuring pocket 5a contains a floating ejecting piston 6, which comprises a screw-threaded adjustable abutment rod 7. The head 5 is slidable as a unit up and down, and is actuated by suitable mechanism including a link 8 and power-driven oscillatable rocker arm 9.

My invention is applied to a dough divider of the foregoing type. A gate 10 is provided to extend across the back of the machine and is connected to side rails 11 slidably mounted in the main housing 12 of the machine. The rails 11 are connected near their ends remote from the gate by a cross rail 13, to which a connecting rod 14 is hinged. The connecting rod 14 slides freely through a suitable bearing 15 in the power arm 16 which actuates the gate 10.

On the free end of the connecting rod 14 is a stop collar 14a, by which the connecting rod, the frame 13, and the gate 10, are retracted when the arm 16 moves to the right, as shown in Fig. 2.

The vertical working faces 10a of the gate 10 serve as guides for the pistons, which are always in direct contact with them. They are smooth-surfaced and straight so that the ends of the abutment rods 7 will slide downward along them from the filling position of the dough pocket, shown in full lines, to the ejecting position indicated by dotted lines at B, without permitting any displacement of the pistons 6 in pockets 5a to occur. The mouth of each pocket 5a passes along wall 3a, shearing off the excess dough and isolating the dough in the pocket from the supply mass in chamber 3 before the pressure in the pocket 5a is relieved by its arrival at the ejecting position B.

The invention is applicable to a machine having one or several dividing pockets and ejecting pistons. For the sake of clearness the following description and the appended claims are in terms of a divider having one pocket and one piston.

The operation is as follows:

When knife 2 is in the position shown in Fig. 2, plunger 4 moves forward, that is, to the left, and applies pressure to the dough mass contained in the pressure chamber 3. The piston 6, 7 of the measuring pocket 5a is forced back by the dough and itself forces back gate 10 to the position indicated in dotted lines at A, together with all of the elements attached to it, including the side rails 11, cross rail 13 and connecting rod 14. The pressure transmitted through the dough pushes back the piston 6, 7 and gate 10 until the latter is stopped when the cross rail 13 comes into contact with an abutment member 17 adjustably mounted on a beam 18 that is fixed to the housing 12. Abutment 17 is preferably in the form of a screw on which is mounted a sprocket wheel 19 rotatable by means of a hand wheel 20 and sprocket and chain connection 21. By hand wheel 20 the operator can adjust the abutment 17 to a position appropriate to produce the size of loaf desired. The described rearward movement of piston 6, 7, and gate 10 occurs while the measuring pockets are in register with the pressure plunger 3, as shown by the full lines in Fig. 2.

In order to discharge the measured dough piece from the pocket 5a, the measuring head moves downward into the position shown in dotted lines at B. The end of abutment rod 7 of the piston slides downward along the vertical face 10a of gate 10 to the position C, maintaining the position of the piston against the pressure of dough in the pocket. Between the filling position A and the discharge position C, the end of measuring pocket 5a passes along the face of a wall 3a which momentarily completely seals off the pocket after it passes out of communication with the pressure chamber 3 and before it arrives at the ejecting position C. After the measured dough piece has been sheared off, and following the downward movement of the measuring head 5 the gate 10 is driven forward, to the full line position in Fig. 2, actuating the piston 6 to eject the dough piece, as will now be described.

Power arm 16 in retracting the knife 2 moves toward the right in Fig. 2. During the first part of its travel it does not affect the connecting rod 14, but when its bearing 15 contacts with the collar 14a the arm 16 begins to draw the cross rail 13, side rails 11, and gate 10 backward from position A into the full line position, causing the piston 6 to eject the dough pieces onto a suitable belt conveyor 22. The arrangement shown of the connecting rod and its collar 14a with respect to the arms 16 permits the gate 10 to rest in any selected position as determined by the adjustable stop 17 without interfering with the forward or cutting-off movement of knife 2.

By the means above described I have produced a simple, accurate and relatively inexpensive means that fulfills each of the conditions stated as an object of the invention.

Having thus described my invention, what I claim and desire to secure by Letters Patent is:

1. In a dough divider having a pressure chamber open at one end, a dividing head having a measuring pocket abutting against and movable transversely to and away from the open end of said chamber, means for forcing dough from said pressure chamber into said measuring pocket, and a floating piston in said pocket, in combination, a gate located behind said measuring pocket and having a working face directly abutted by said piston, said working face maintained parallel with the path of movement of said head to keep the piston in place during the movement of the head from its filling position to its discharge position, said gate mounted for movement axially of said pocket, and arranged to be moved backward by the piston as it is displaced by the dough forced into the pocket, adjustable means for limiting the backward movement of said gate, and power-actuated means for moving the gate forward to propel the piston and eject the dough from the pocket.

2. The mechanism claimed in claim 1, wherein the gate is fixedly mounted on a frame, said frame slidably mounted in the body of the machine and comprising a pair of side rails connected at their outer ends to said gate and a cross-rail connecting the inner ends of said side rails, wherein said power-actuating means is operatively connected to said frame, and wherein said adjustable means for limiting the backward movement of said gate comprises an abutment member positioned in the path of movement of said cross-rail, a screw and nut assembly carrying said abutment member, and means operable on the outside of the machine-housing for effecting the relative rotation of the screw and nut for shifting the position of said abutment member along the path of movement of said cross-rail.

In testimony whereof, I affix my signature.

GUSTAV B. EGGERT.